Figure 1:
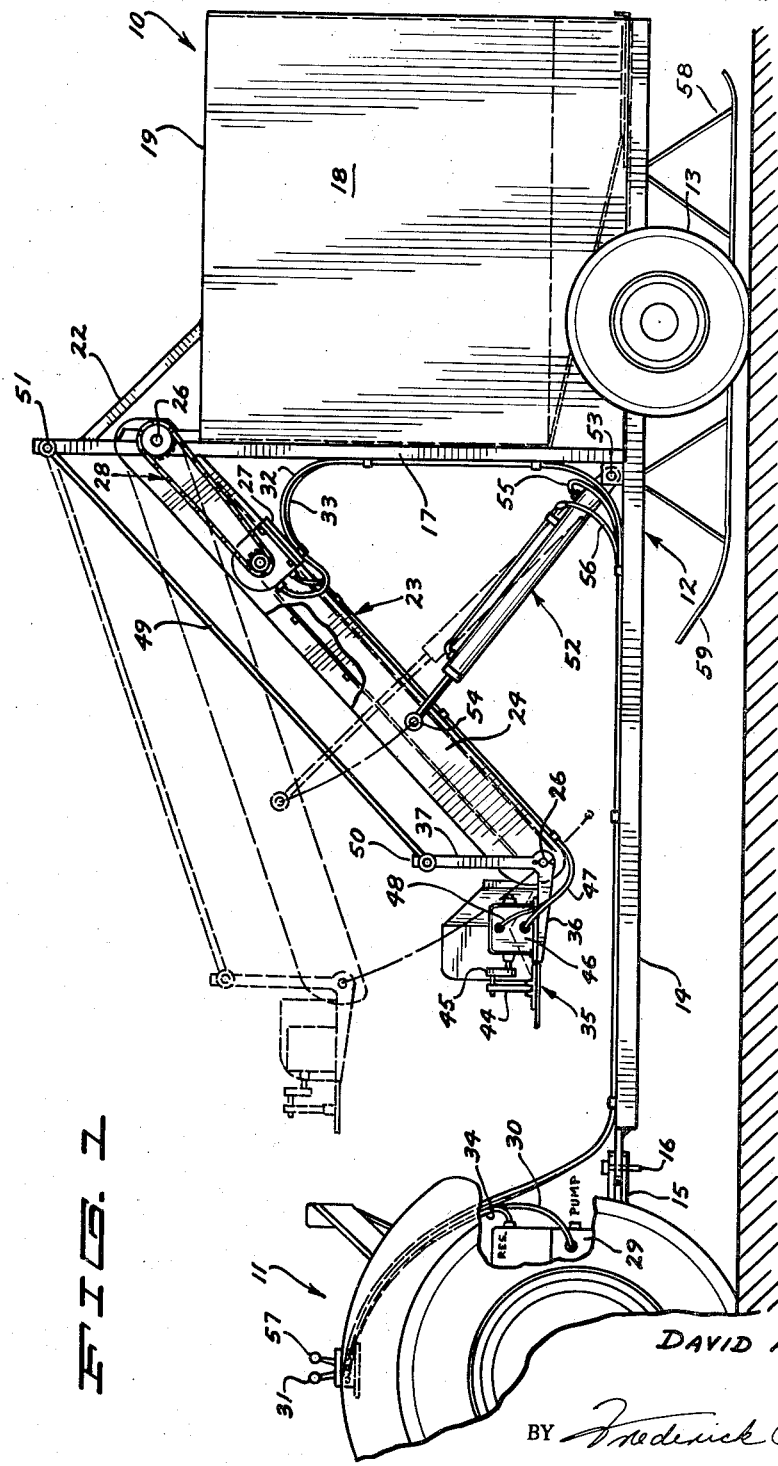

June 12, 1962

D. A. VINCENT 3,038,287

HARVESTER FOR CATTAILS

Filed July 16, 1959

2 Sheets-Sheet 1

INVENTOR
DAVID A. VINCENT

BY *Frederick C. Meyers*

ATTORNEY

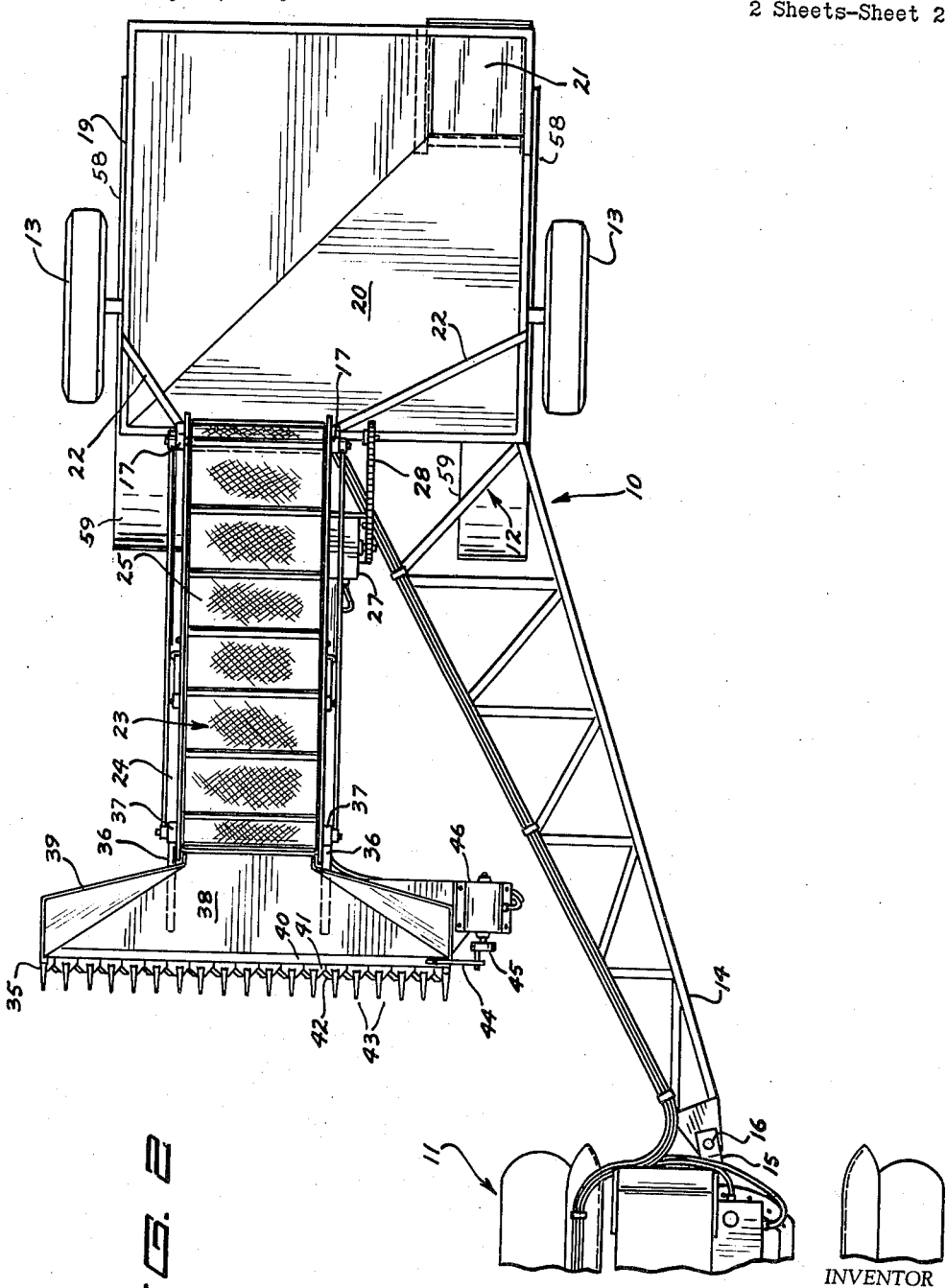

3,038,287
HARVESTER FOR CATTAILS
David A. Vincent, Wilton, Minn., assignor to Typha Products, Inc., Bemidji, Minn., a corporation of Minnesota
Filed July 16, 1959, Ser. No. 827,995
4 Claims. (Cl. 56—23)

This invention relates to harvesters, and more particularly to harvesting equipment for cutting and collecting the heads of cattail plants.

The ripe heads of cattail plants are utilized for the fiber and seed contained therein while the stem portions are discarded. During the separation of the fluffy fibrous material, the presence of excess stem material can curtail and hamper the separation. For this reason, it is desirable to cut the heads from the stems, leaving as little of the stem material as possible in the severed head. Because cattails grow to various heights and the ground in which they grow is often soft and irregular, it is difficult, if not impossible, to successfully harvest cattail heads with conventional equipment.

Further, the thick stems and dense growth of cattails render the passage of small wheeled equipment therethrough very difficult and skids, caster wheels and the like are extremely difficult to pull through the growth.

It is, therefore, within the contemplation of the present invention and an important object thereof to provide a cattail harvester which will efficiently and easily cut and collect cattail heads with a minimum of stem material remaining therewith.

Another object of the invention is to provide a machine of the class described which will have its cutting and conveying members supported from an upper position on a frame so as to remain free of ground contacting members and to offer a minimum of resistance during travel.

A further object of the invention is to provide a cutting and conveying mechanism which will continuously deliver cattail heads to a vehicle box, yet will be capable of rapid adjustment of height during its operation to accommodate the conditions of the cattails and the terrain in which they are growing.

It is a still further object of the invention to provide a self-leveling mechanism which will operate through raising and lowering the conveyor to maintain the cutter in proper horizontal attitude.

Yet another object of the invention is to provide actuating means for the cutter member and for operating the conveyor, which means are completely independent of one another and of the raising and lowering mechanism so that drives and driving linkages designed to operate under relative shifting conditions may be dispensed with.

These and other objects and advantages of my invention will more fully appear from the following description, made in connection with the accompanying drawings wherein like reference characters refer to the same parts throughout the several views and in which:

FIGURE 1 is a side elevation of my cattail harvester attached to a vehicle provided with control members, portions of the structure being cut away to show hidden parts and the cutting and conveying members being indicated at raised position in dotted outline; and FIGURE 2 is a top plan view of the harvester illustrated in FIGURE 1.

With continued reference to the drawings, my cattail harvester is indicated generally at 10 and is adapted to be pulled at the rear end of a vehicle such as tractor 11. The harvester is provided with a frame 12 which is provided with ground-contacting members such as the rubber-tired wheels 13, as shown. The forward end of the frame terminates in a drawbar 14 which may be secured to the clevice 15 by kingpin 16 so as to be supported for pulling and turning without additional ground contact on the part of the harvester 10. A portion of frame 12 intermediate its ends constitutes the rigid upright standards 17 which provide additional support and mounting structure, as will be described.

Rearwardly of the uprights 17 is a collecting box 18 having an open top 19 and a beveled bottom 20 terminating downwardly in a gated discharge 21, as shown in FIGURE 2. Additional braces 22 may be interposed between the upright standards 17 and box 19, as shown.

It will be observed that the upright standards 17 are offset on frame 12 from the drawbar 14, the latter extending forwardly in an angle so that the entire harvester 10 will track to the right of vehicle 11 in the direction of travel. An important part of the present invention resides in the conveyor and cutter portions which may be rapidly and simultaneously adjusted for height during operation of the harvester, yet maintaining themselves at all times in free clearance above the ground. The entire harvester, as shown, can thus be supported and pulled on two rubber-tired wheels 13 in such a manner as to offer minimum resistance as the harvester is pulled through the cattails.

The elongated conveyor 23 has a frame 24 and an apron 25 trained in endless manner about roller members 26 journaled in frame 24 in spaced horizontal relation one at each end of the frame. Upper drive roll 26 is journaled to the upright standards 17 in such a manner as to provide a pivotal axis for the entire conveyor 23 and to maintain the rear end thereof adjacent the top 19 of box 18 for delivery and discharge of cattail heads thereinto.

Mounted upon the conveyor frame 24 is a hydraulic motor 27 having a direct drive assembly 28 for rotating the upper apron roller 26, as shown in FIGURE 1. Hydraulic motor 27 may be actuated by hydraulic pump 289 through pressure line 30, control valve 31 mounted on the rear of tractor 11 through supply line 32, return line 33 and to the reservoir conduit 34, as shown.

At the lower end of the conveyor 23 is mounted a horizontal cutter member 35 so that cattail heads cut thereby will tumble rearwardly and be gathered by apron 25 of conveyor 23 and then be raised and discharged into the bin 18 as previously described. The cutter member 35 may be maintained in its horizontal position through its L-shaped mounting 36 as shown in FIGURE 1. The mounting member has an upright leg 37 and may be pivotally mounted upon the axis of the lower roller 26, as shown. The cutter member 35 has a rigid bottom portion 38 with angulated side walls 39 for directing the cattail heads into the conveyor. Cutter member 35 may be provided with a cutter bar 40 having a plurality of sickle blades 41 reciprocating against ledger plates 42 which, in turn, are mounted in guard teeth 43 as in a conventional mower. A pitman 44 interconnects the sickle bar 40 with an eccentric 45 in turn rotatably driven by the hydraulic motor 46, as shown in FIGURES 1 and 2. Hydraulic motor 46 may be powered through hydraulic pressure line 47 and return line 48 which, in turn, communicate respectively with the pressure and return lines 32 and 33 previously described. Valve control 31 can, therefore, operate both the hydraulic motors 27 and 46 simultaneously.

A leveling rod 49 is pivotally secured at 50 to each of the upright legs 37 of the L-shaped frame 36. The upper ends of each of the leveling rods 49 are pivotally connected at 51 to the respective upright standards 17 so that the leveling rod 49 will lie in spaced parallel relation with the conveyor 23 as shown in FIGURE 1. Raising and lowering means such as the hydraulic ram 52 is pivotally connected at 53, one at each side of the conveyor 23. The upper end of each of the hydraulic rams 52 is pivotally connected at 54 to the respective sides 24 of the conveyor. Hydraulic force is supplied through line 55 and returned through line 56 to extend and retract the ram 52, as desired. The flow of hydraulic pressure fluid through line 55 is controlled by the valve 57 at the rear of tractor 11 and is powered through the pump line 30 as previously described.

Since, in some instances, cattails must be harvested in soft and swampy ground, it becomes desirable to supplement wheels 13 with skids 58 which are located inwardly of the wheels and secured to frame 12 so as to project both forwardly and rearwardly of the wheels 13. Skids 58 lie several inches above the ground and are provided with upturned ends 59 for riding over humps and uneven ground during use.

The use and operation of my cattail harvester will be apparent from the foregoing. A minimum of resistance is offered by the cattails since a swathe is cut forwardly of the wheels 13. The tractor can run in a swathe previously cut. As the harvester proceeds, the valve control 57 may be utilized to rapidly raise or lower the elongated conveyor 23 while the hydraulic motors 27 and 46 continue to operate. Both the cutter member 35 and the conveyor 23 are simultaneously raised and lowered, but the cutter member is maintained horizontal at all times and the upper end of the conveyor is always in a position to deliver cattail heads to the box 18. Since the raising and lowering of the conveyor and cutter members is achieved without a ground-contacting, height-gauging mechanism, the space below the conveyor and cutter remains free for low resistance and high cutting efficiency.

It will, of course, be understood that various changes may be made in the form, details, arrangement and proportions of the parts without departing from the scope of my invention as set forth in the appended claims.

What I claim is:

1. A cattail harvester comprising, a supporting frame having depending ground-contacting means, a collecting box supported upon said frame, an elongated conveyor positioned forwardly of the box and having its rear end swingably mounted thereon adjacent the top of said box, a horizontal cutter member swingably mounted to the forward end of said conveyor, said frame having a drawbar lying to one side and terminating forwardly of said cutter member, and leveling means interconnecting said frame and said cutter member, adjusting means operatively associated with said frame and conveyor whereby said conveyor and cutter members may be adjustably supported while maintaining the cutter member in horizontal position.

2. The harvester of claim 1 wherein said adjusting means comprises extensible and retractable means secured at one end to said frame and at the other end to said conveyor.

3. The harvester of claim 1 wherein a hydraulic motor is mounted on said cutter member to actuate it, and a second hydraulic motor is provided having driving connection with said conveyor to actuate it.

4. The harvester of claim 1 wherein a pair of mud skids are provided lying slightly above the ground and connected to said frame to support it when said depending ground contacting means sink into soft ground.

References Cited in the file of this patent

UNITED STATES PATENTS

| | | |
|---|---|---|
| 1,939,851 | Horste | Dec. 19, 1933 |
| 2,209,625 | Jensen | July 30, 1940 |
| 2,609,650 | Lindquist | Sept. 9, 1952 |